Figure 1:
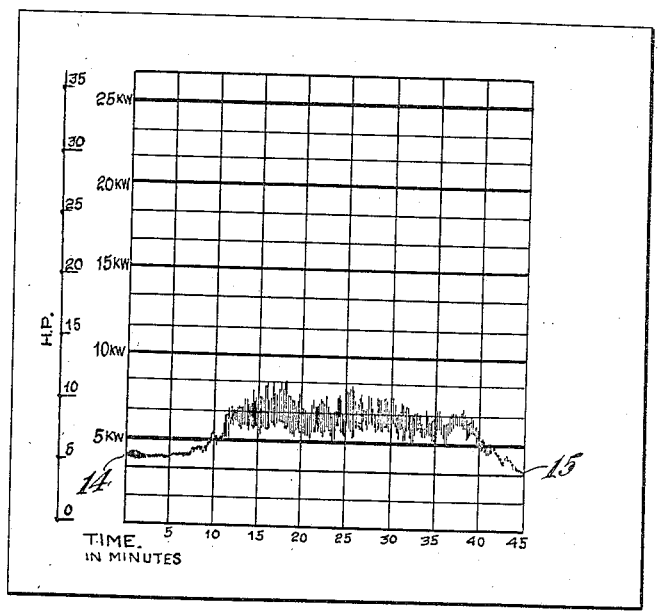

March 13, 1934.   H. L. LEVIN   1,950,451
AQUEOUS DISPERSION OF RUBBER
Filed Feb. 4, 1931

INVENTOR
Harold L. Levin
BY
Samuel Stearman
ATTORNEY

Patented Mar. 13, 1934

UNITED STATES PATENT OFFICE 1,950,451

AQUEOUS DISPERSION OF RUBBER

Harold L. Levin, Nutley, N. J., assignor, by mesne assignments, to The Patent and Licensing Corporation, New York, N. Y., a corporation of Massachusetts Application February 4, 1931, Serial No. 513,351

11 Claims. (Cl. 134—17)

This invention relates to improvements in the art of making aqueous dispersions of rubber.

Several methods have heretofore been suggested for the production of aqueous dispersions of rubber which for many purposes could be employed to advantage in lieu of natural latex.

The workers in this art have recognized the feasibility of making rubber dispersions by processes including the use of various types of colloids as an agent for assisting in the dispersing action. Thus, for example, colloidal clay has been successfully employed in the manufacture of dispersions of this type. Likewise certain soaps have been employed for this purpose, and while in those instances where rubber dispersions have been successfully made, the resulting dispersion possesses certain common characteristics, there are some rather distinct differences in the physical properties of the dispersions made with these different types of dispersing agents. Thus, while rubber dispersions made with a dispersing agent of one type may be suitable for certain purposes, they are not equally as suitable for other purposes of use, whereas the rubber dispersion made with a dispersing agent of a different type will likewise be suitable for certain purposes but not necessarily for all purposes to which these products may be adapted. As illustrating the foregoing, it may be stated for example that rubber dispersions made with colloidal clay as a dispersing agent are, due to their high mechanical and chemical stability eminently suitable for the manufacture of waterproof paper by processes involving the admixture of the paper pulp with the dispersion and the subsequent formation of the paper sheet from the mixture. Aqueous dispersions of this type are likewise suitable as coatings for numerous purposes, but where a dispersion of a highly tacky nature capable of carrying a high proportion of filler is desired, a dispersion of rubber, made with colloidal clay, is not as satisfactory as one made with or containing soap as the dispersing agent. On the other hand the dispersions made with soap are not normally susceptible to uses involving the admixture therewith of substantial quantities of strong electrolytes, nor to the production of waterproof paper by admixture with pulp for running the mixture over the usual paper making machines, unless the dispersion is first subjected to a treatment for rendering the same stable to these influences.

Generally speaking, two rather distinct types of operation are known for effecting dispersion of rubber in water. According to one known process for producing dispersions of rubber in water, the rubber, as for example crude rubber, i first milled on an ordinary rubber mixing mill until the rubber becomes warm and plastic. Thereupon, a colloid is milled into the rubber on the mill and the milled plastic mass of rubber containing the colloid is then transferred to a kneading machine such as a Werner-Pfleiderer mixer, and a small amount of water added to the mass in the mixer and caused, during the operating of the mixer, to be completely absorbed by the rubber mass, after which water is added from time to time while the rubber mass in the mixer is being constantly kneaded, pulled and stretched until finally a condition of the mass is reached in which the phases invert to bring the rubber into the disperse phase and the colloid and water into the continuous phase.

Inasmuch as the process referred to involves, during the major portion of the operation, the pulling, stretching and kneading of the rubber mass in the mixer while it is being maintained in the continuous phase, this process in actual process in actual practice requires a relatively long time to bring to completion, entails the expenditure of a great deal of power, results in considerable wear and tear upon the machinery, and requires careful supervision and strict adherence to a definite time schedule for the successive additions of water in the second stage of the process in order to introduce the water at such a rate as to avoid the formation of lumps which can be dispersed only with great difficulty.

As distinguished from an operation as thus described, it has heretofore been proposed to make dispersions of rubber by a process in which milled or plasticized rubber is added to a water paste of a colloid in a suitable kneading or masticating machine of the Werner-Pfleiderer type and the operation carried out under conditions such that the colloidal paste is at all times maintained in the continuous phase, the rubber being gradually dispersed under the action of the kneading or masticating machine in the continuous phase of colloidal paste. This type of dispersing operation possesses certain advantages over the operation first above described. One noteworthy advantage is that much less power is expended in effecting complete dispersion of the rubber in water, owing to the fact that by continually maintaining the colloidal paste in the external phase, the plasticized rubber becomes dispersed by the kneading or shearing action of the masticating machine and the continued trituration of the rubber thereby, and hence power is required only for the purpose of mixing or circulating the mass in the mixer and for repeatedly bringing the rubber into the path or zone of action of the blades of the mixing machine; whereas in the first-named process the rubber mass is for the greater part of the operation maintained as a coherent mass in the continuous phase, and hence much greater power is needed continually to stretch and pull the rubber in order to cause the water to be absorbed thereby until the phases are changed or reversed, and the water and colloid brought into the external phase. Furthermore, the point at which this last named condition is reached in the operation of the first-described process is ascertainable or observable only by one skilled in practicing the process, whereas in an operation in which the aqueous colloidal paste is maintained at all times in the continuous phase, no special skill is required in recognizing the completion of the dispersing operation, and in addition, this latter operation requires less time, and reduces the wear and tear upon the operating equipment.

In order to illustrate the advantages of operating according to my invention from the point of view of power consumption as compared with an operation of the type first above described, I have shown in the accompanying drawing, reproductions of typical curves as shown by a recording watt-meter indicating the power consumption for a 50 H. P. motor used for driving a Werner-Pfleiderer mixer employed in comparative runs.

Figure 2:
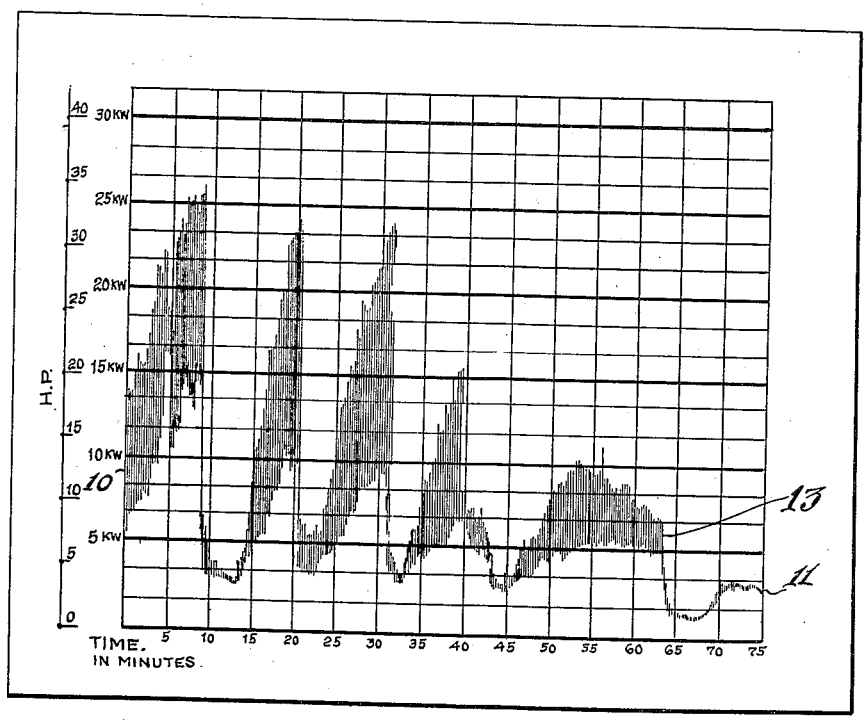

In the drawing,

Figure 1 represents the power chart obtained on a typical run according to my process, and Figure 2 represents the power chart obtained on a typical run employing the same quantities of rubber and dispersing agent but operating according to the process wherein water is first caused to be absorbed by the rubber while the latter is being pulled and stretched as a coherent continuous mass and on gradual addition of further quantities of water, bringing about a condition in which the phases invert.

Referring first to the power curve shown in Figure 2, it will be noted that this curve between the starting point indicated by numeral 10 and the end point indicated by numeral 11 is characterized by a series of peaks and intervening depressions. The peaks in the curve represent the stage of the operation during which the rubber is in the form of a coherent mass adhering to the blades of the mixer and being stretched and pulled thereby. It will be noted that each depression in the curve is preceded by a sudden drop in power demand, indicating one of the stages of the operation at which practically no work is being done on the rubber and being a stage of the operation in which the mass has been parted from the blades and the mixer is running practically idle due to the introduction of water. Between each depression and a succeeding peak, it will be seen, that the power demand gradually builds up, indicating that the mass is absorbing water and that the rubber is being manipulated as a continuous coherent mass, until when water thus is completely absorbed by the rubber, a very high power demand is again evidenced. The operation thus repeats itself with a series of wide fluctuations in power consumption and gradual diminution in the peak load requirements during the successive periods of water absorption by the rubber mass until finally, when the water content of the rubber mass has reached the limiting point the phases reverse as indicated by the numeral 13, from which point onward, the power consumption is relatively low, indicating that the rubber is then in the dispersed phase.

Referring now to the power curve shown in Figure 1, it will be observed that when operating my process, the power curve exhibits a distinct straight line characteristic in an extremely low power consumption range with only minor fluctuations in power consumption from the very beginning of the operation indicated by 14 to the very end of the dispersing operation indicated by 15.

The minor fluctuations in the curve represent slight changes in the consistency of the aqueous pasty mass being acted upon.

By comparison of the curve of Figure 1 with that of Figure 2 it will be observed that the operation according to my process may be carried out with a small fraction of the power consumption required by an operation as herein described and typified by the curve of Figure 2, and that furthermore the power demand is substantially uniform throughout the dispersing operation, varying only from about 7 H. P. to a maximum of about 11 H. P.; and in fact does not substantially exceed by more than 7 H. P. the power requirements for agitating the aqueous paste alone, whereas in an operation such as represented by the curve of Figure 2, the power demand fluctuates widely from a minimum of about 4 H. P. when the mixer is practically idle as above explained to a maximum of about 35 H. P. as represented by the peaks in the curve. In addition, it will be observed that the time required for completing the operation in the masticating machine according to the operation of my process is about one-third less than in the case of the type of operation graphically illustrated by the curve of Figure 2.

My invention is particularly concerned with the production of an aqueous dispersion of rubber in which soap or soap-like materials are employed as the dispersing agent, by a process in which the rubber is caused to be dispersed in an aqueous paste of the dispersing agent maintained as the continuous phase, the operation being accordingly one typified by the curve of Figure 1.

According to the invention, I provide an improved process for the production of rubber dispersions which have certain desirable properties adapting them especially to uses to which dispersions of rubber made with substances such as colloidal clay are not equally adaptable. One such use to which dispersions produced in accordance with my present invention may be applied is as a back coating for rugs and other textiles in which the dispersion employed as the rug backing serves to bind or lock fibres to a foundation fabric, as for example, in accordance with my Patent No. 1,774,204. It will be understood, however, that the dispersions produced in accordance with the invention are not confined to this use but may be readily adapted to numerous other uses, as for example, in the production of doubler cloths, proofed cloths, sealing compositions and the like.

In order to provide a process which will be feasible for commercial operation, for the production of a dispersion of the type indicated by an operation as above set forth and thereby securing the advantages of such an operation as heretofore described, I have found that it is necessary to combine with the soap or soap-like material employed as the dispersing agent, certain substances which will function to impart to the soap paste an attriting property which gives what I may term a "gripping" or "tooth" action whereby the normal slippery character of the soap is reduced to such a point as to facilitate the interfacial trituration that is necessary for causing gradual, complete and satisfactory dispersion of the rubber while the aqueous mass is maintained in the continuous phase. Were it not for the presence of the attriting agent, the soap that would be used in concentrations necessary to make a stiff paste would occupy an exceedingly small volume in the mixer and the result of the mechanical action of the mixer would be to cause the soap to be absorbed by the rubber. On the other hand, merely increasing the bulk or volume by addition of water to prevent such absorption, results in a matrix of such high fluidity that no effective dispersing action can take place, the rubber being simply churned about in the fluid charge. The function of the attriting agent therefore is additionally, to give mass and bulk to the dispersing medium and to provide the necessary amount of water to ensure the presence of a paste of the required stiffness and of the necessary volume. The substances that may be employed for this purpose according to the invention, are preferably of non-colloidal character and an advantage of the invention is the fact that the material employed for imparting this desirable property may be a substance such as is usually employed as a compounding ingredient for rubber compositions. One such substance that I may employ for this purpose is whiting. Other substances for this purpose may include slate dust, diatomaceous earth, silex, and the like.

Illustrating one practical embodiment of the invention, 850 parts of reclaim rubber are subjected to a plasticizing operation in a Banbury or equivalent mixer together with 45 parts of a softener such as cumar, mineral rubber, or gum rosin to facilitate plasticization of the rubber, for a period of approximately twenty minutes. Approximately 160 parts of rosin soap mixed with 100 parts of water may then be combined with approximately 700 parts of whiting and 250 parts of water until the whole forms a relatively stiff aqueous paste. The stiff paste used in accordance with the invention should be of a consistency varying within limits from that of a putty to such consistency that it is incapable of complete efflux from a Pennsylvania Railroad pipette, although the pastes of heavier consistencies within this range provide more effective working conditions. This paste is then placed in a kneading or masticating machine preferably of the Werner-Pfleiderer type, and the mass of plasticized rubber is then added either as a single mass, or progressively, to the paste in the mixer and the mixer continued in operation for approximately thirty to eighty minutes, with steam passing through the jackets of the mixer in order to maintain the temperature of the contents at approximately 180° F., until the rubber is completely dispersed in the paste in the form of finely divided particles. If the kneading or masticating machine employed for the dispersing operation is open so as to expose the contents to the atmosphere, there may be a continued loss of water by evaporation during the operation and consequent thickening of the mass; likewise the progressive diminution of the rubber particles, presenting increased surface areas for absorption of water, may serve to cause excessive thickening of the pasty mass in the mixer. In either event, therefore, small quantities of water may be added during the dispersing action to compensate for water lost by evaporation or to minimize increasing thickness due to continued subdivision of the particles, so that the mass will at all times be maintained at a proper working consistency such as effectively to promote the interfacial trituration of the rubber without permitting the mass to become unduly thick. After the dispersing operation as thus described has been carried to the point where the particles are sufficiently finely divided, i. e., ranging in average size from about 2 to about 20 mu, and dispersed in the aqueous continuous phase, the dispersion may be diluted to the desired consistency for use by addition of suitable quantities of water. Part or all of this water for dilution may be added to the dispersed mass in the mixture in the form of a suspension containing other fillers that may be desired in the finished product, and/or vulcanizers and vulcanization accelerators. These materials may, however, if desired, be added in the dry state to the completed dispersion. Thus, for example, in an operation with quantities of rubber and dispersing agent as above indicated, which was intended to produce a dispersion suitable for use as a rug backing, approximately 4,000 parts of dilution water were employed, of which 2,000 parts were mixed with 120 parts of a water-soluble gum, as gum tragacanth for extending and bodying the dispersion, 30 parts of sulphur, 50 parts zinc oxide and 2 parts of a vulcanization ultra-accelerator. This mixture was first added to the completed dispersion in the Werner-Pfleiderer mixer and thereupon dilution was completed with the remaining 2,000 parts of water. Dispersions of rubber as thus made according to the invention, exhibit marked superiority from the point of view of physical and chemical stability over rubber dispersions made by the use of a soap as the dispersing agent, due probably to the presence of the powder used as the attriting agent, in the interface.

The dispersion as thus produced accordingly comprises the ingredients in the following approximate percentages by weight on a dry basis.

| | Percent |
|---|---|
| Reclaim rubber | 32 |
| Soap | 5 |
| Whiting | 55 |
| Zinc oxide | 2 |
| Sulphur | 1 |
| Gum | 5 |
| Vulcanization accelerator | (0.05) |

It will be understood of course that the relative proportions of the ingredients may be varied within considerable latitudes.

In order to mask the natural odor of the product minute quantities of an essential oil may be added at any stage of the operation or to the finished product. A water soluble preservative such as ammonia or formaldehyde may likewise be incorporated to prevent putrefaction of the organic constituents.

I claim is my invention:

1. The process of making an aqueous dispersion of rubber which comprises dispersing plasticized rubber in a relatively stiff aqueous paste of a water soluble organic colloid and an attriting agent while maintaining said paste as the continuous phase.

2. The process of making an aqueous dispersion of rubber which comprises dispersing plasticized rubber in a relatively stiff aqueous paste of a water soluble organic colloid and a non-colloidal mineral powder while maintaining said paste as the continuous phase.

3. The process of making an aqueous dispersion of rubber which comprises dispersing plasticized rubber in a relatively stiff aqueous paste of a water soluble organic colloid and whiting while maintaining said paste as the continuous phase.

4. The process of making an aqueous dispersion of rubber which comprises dispersing plasticized rubber in a relatively stiff aqueous paste of soap and an attriting agent while maintaining said paste as the continuous phase.

5. The process of making an aqueous dispersion of rubber which comprises dispersing plasticized rubber in a relatively stiff aqueous paste of soap and a non-colloidal mineral powder while maintaining said paste as the continuous phase.

6. The process of making an aqueous dispersion of rubber which comprises dispersing plasticized rubber in a relatively stiff aqueous paste of soap and whiting, while maintaining said paste as the continuous phase.

7. The process of making an aqueous dispersion of rubber which comprises dispersing plasticized rubber in a relatively stiff aqueous paste of rosin soap and whiting, while maintaining said paste as the continuous phase.

8. The process of making an aqueous dispersion of rubber which comprises plasticizing rubber in the presence of a softening agent, adding the plasticized rubber to a relatively stiff paste of a water soluble organic colloid and a non-colloidal attriting agent, and causing the rubber to be dispersed in said paste while maintaining the same as the continuous phase.

9. The process of making an aqueous dispersion of rubber which comprises plasticizing rubber in the presence of a softening agent, adding the plasticized rubber to a relatively stiff paste of soap and a non-colloidal attriting agent, and causing the rubber to be dispersed in said paste while maintaining the same as the continuous phase.

10. The process of making an aqueous dispersion of rubber which comprises plasticizing rubber in the presence of a softening agent, adding the plasticized rubber to a relatively stiff paste of soap and whiting, and causing the rubber to be dispersed in said paste while maintaining the same as the continuous phase.

11. The process of making an aqueous dispersion of rubber which comprises plasticizing the rubber in the presence of a softening agent, adding the plasticized rubber to a relatively stiff paste of a water soluble organic colloid and a non-colloidal attriting agent, masticating the rubber in said paste, the paste being of sufficient bulk to prevent absorption thereof by the rubber, and causing the rubber to be dispersed in said paste while maintaining the same as the continuous phase.

HAROLD L. LEVIN.